(12) United States Patent
Neely

(10) Patent No.: US 7,127,082 B2
(45) Date of Patent: Oct. 24, 2006

(54) ACTIVE FIDUCIALS FOR AUGMENTED REALITY

(75) Inventor: Howard Neely, Manhattan Beach, CA (US)

(73) Assignee: HRL Laboratories, LLC, Malibu, CA (US)

( * ) Notice: Subject to any disclaimer, the term of this patent is extended or adjusted under 35 U.S.C. 154(b) by 650 days.

(21) Appl. No.: 10/259,948

(22) Filed: Sep. 27, 2002

(65) Prior Publication Data

US 2004/0071315 A1    Apr. 15, 2004

(51) Int. Cl.
*G06K 9/00* (2006.01)

(52) U.S. Cl. .................... 382/103; 709/203
(58) Field of Classification Search ............ 382/103, 382/307; 342/57, 357.1, 357.16, 361, 367; 348/14.01, 14.02, 169, 211.3, 231.9, 724, 348/14.1, 140.2; 709/203; 715/744; 725/81, 725/123

See application file for complete search history.

(56) References Cited

U.S. PATENT DOCUMENTS

| | | | | |
|---|---|---|---|---|
| 5,528,232 A * | 6/1996 | Verma et al. | .......... | 340/825.49 |
| 5,776,612 A | 7/1998 | Fisher | | |
| 5,926,568 A | 7/1999 | Chaney et al. | | |
| 6,064,749 A * | 5/2000 | Hirota et al. | .......... | 382/103 |
| 6,173,316 B1 * | 1/2001 | De Boor et al. | .......... | 709/218 |
| 6,236,365 B1 * | 5/2001 | LeBlanc et al. | .......... | 342/457 |
| 6,356,529 B1 * | 3/2002 | Zarom | .......... | 370/231 |
| 6,473,609 B1 * | 10/2002 | Schwartz et al. | .......... | 455/406 |
| 6,560,640 B1 * | 5/2003 | Smethers | .......... | 709/219 |

OTHER PUBLICATIONS

Y. Cho, J. Park, U. Neumann, "Fast Color Fiducial Detection and Dynamic Workspace Extension in Video See-Through Self-Tracking Augmented Reality," Proceedings, The Fifth Pacific Conference on Computer Graphics and Applications, IEEE Computer Society, Los Alamitos, CA, Oct. 1997, pp. 168-177, 222.

Y. Cho, U. Neumann, "Multi-ring Color Fiducial Systems for Scalable Fiducial Tracking Augmented Reality," Proceedings, IEEE 1998 Virtual Reality Annual International Symposium (VRAIS '98), IEEE Computer Society, Los Alamitos, CA, Mar. 1998, pp. 212-215.

S. Fickas, et al., "Software Organization for Dynamic and Adaptable Wearable Systems," Digest of Papers, First International Symposium on Wearable Computers, 1997, ACM, Press, Cambridge, MA, Oct. 1997, pp. 55-63.

(Continued)

*Primary Examiner*—Jingge Wu
*Assistant Examiner*—Abolfazl Tabatabai
(74) *Attorney, Agent, or Firm*—Tape-McKay & Associates

(57) ABSTRACT

The present invention provides active fiducials for use with augmented reality client systems. A computer system, a method, and a computer program product are presented, which provide location-registered patterns for providing information regarding objects in an area. The computer system comprises a memory for storing information regarding at least one object, the information including the location of an object. A processor is connected with the memory to retrieve a portion of the information, including the location of the object, from the memory for transmission to the client system via a wireless communication module which is connected with the processor and is configured to detect a compatible client system within communication range of the wireless communication module, and if a compatible client system is detected, to transmit a portion of the information regarding the object, including the location of the object, from the computer system to the client system.

78 Claims, 3 Drawing Sheets

OTHER PUBLICATIONS

L. Krumenaker, "Virtual Assembly," MIT Technology Review, Massachusetts Institute of Technology, Cambridge, MA, Feb./Mar. 1997, pp. 18-19.

J. Rekimoto, "NaviCam: A Magnifying Glass Approach to Augmented Reality," Presence: Teleoperators and Virtual Environments, vol. 6, No. 4, MIT Press, Cambridge, MA, Aug. 1997, pp. 399-412.

T. Starner, et al, "Augmented Reality through Wearable Computing," Presence: Teleoperators and Virtual Environments, vol. 6, No. 4, MIT Press, Cambridge, MA, Aug. 1997, pp. 386-398.

R.T. Azuma, "A Survey of Augmented Reality," Presence: Teleoperators and Virtual Environments, vol. 6, No. 4, MIT Press, Cambridge, MA, Aug. 1997, pp. 355-385.

R. Want, et al., "The Active Badge Location System," ACM Transactions on Information Systems, vol. 10, No. 1, 1992, pp. 91-102.

Web page, "Socket Communications: Bluetooth Products," Socket Communications, Inc. 2001, (http://www.socketcom.com/product/bluetooth.htm).

Web page, "Bluetooth Developers," Socket Communications, Inc. 2001, (http://www.socketcom.com/product/bluetooth_dev.htm).

CF+ and Compact Flash Specification, Revision 1.4, CompactFlash Association, Palo Alto, CA Apr. 1999 (http://www.compactflash.org).

M. Reddy, L. Iverson, GeoVRML 1.0 Recommended Practice, Version 1.0.7, GeoVRML Working Group, Web 3D Consortium (http://www.geovrml.org/1.0/doc/index.html).

Web page "CerfBoard for Windows: Specifications," (http://www.intrinsyc.com/products/referenceplatforms/cerfboard_winspecs.html).

GeoVRML compact Document Type Description, Extensible 3D (X3D) Task Group, Web 3D Consortium, (http://www.web3d.org/TaskGroups/x3d/translation/GeoVrml-compact.dtd).

"Universal Unique Identifier," DCE 1.1: Remote Procedure Call, CAE Specification, Doc. No. C706, The Open Group, Oct. 1997, (http://www.opengroup.org/onlinepubs/009629399/apdxa.htm).

Web page, "Extensible Markup Language (XML) 1.0 (Second Edition)," W3C Recommendation Oct. 6, 2000, World Wide Web Consortium (W3C) (http://www.w3.org/TR/REC-xml).

Web page, "Extensible Markup Language (XML)," World Wide Web Consortium (W3C), (http://www.w3.org/XML/).

International Standard, ISO/IEC 14772-1:1997, The Virtual Reality Modeling Language, International Organization for Standardization, (http://www.web3d.org/technicalinfo/specifications/vrml97/index.htm).

Web page, "Extensible 3D (X3D) Task Group," Web 3D Consortium, (http://www.web3d,org/x3d.html).

Specification of the Bluetooth System, Core, vol. 1, LM Ericsson, IBM, Intel Corporation, Nokia Corporation, and Toshiba Corporation, Dec. 1, 1999.

Specification of the Bluetooth System, Core, vol. 2, LM Ericsson, IBM, Intel Corporation, Nokia Corporation, and Toshiba Corporation, Dec. 1, 1999.

U. Neumann, S. You, Y. Cho, J. Lee, J. Park, "Augmented Reality Tracking in Natural Environments," In Mixed Reality: Marginig Real and Virtual Worlds, Y. Ohta and H. Tamura eds., Springer-Verlag, Berlin, 1999.

K. Kangas, J. Roning, "Using Code Mobility to Create Ubiquitous and Active Augmented Reality in Mobile Computing," Proceedings of the Fifth Annual ACM/IEEE International Conference on Mobile Computing and Networking, ACM Inc., New York, Aug. 1999, pp. 48-58.

K.L. Dempski, "Context-Sensitive eCommerce," 2000 Conference on Human Factors in Computer Systems (CHI 2000) Extended Abstract.

* cited by examiner

ACTIVE FIDUCIALS FOR AUGMENTED REALITY

BACKGROUND (1) Technical Field

The present invention is related to the field of augmented reality, and more particularly to objects (fiducials) used to enhance the capabilities of augmented reality systems by providing location information and additional information regarding the objects.

(2) Discussion

Registration of virtual objects to real world objects is currently one of the most difficult challenges in building effective augmented reality systems. Accurate head tracking is a key part of this problem. Video see-through augmented reality systems have been demonstrated that use a video-based tracking system to track the location, in the video, of fiducial objects of known position and use these tracker measurements to estimate head orientation and location of the user. One drawback with these systems is that the location and appearance of the fiducials must be known in advance. This limits the use of fiducial-based tracking in actual working environments.

Two examples of fiducial use with augmented reality systems are disclosed in U.S. Pat. No. 6,064,749 to Hirota et al. and U.S. Pat. No. 5,926,568 to Chaney et al. U.S. Pat. No. 6,064,749 discloses a system in which landmarks are found in input image sequences and are used as fiducials to track the camera position and orientation. However, using landmarks requires knowledge of the landmark locations. Landmark locations serve as "passive" fiducials in the sense that they do not actively provide information to the augmented reality system. Rather, their location is already known and their world space positions are precisely calibrated in the system. U.S. Pat. No. 5,926,568 is similar in the sense that it uses known landmarks, but it provides an image-based object matching technique that uses passive fiducials.

Other examples of fiducial uses with augmented reality systems are discussed in the literature. The references provided below provide a combination of patents and articles that can assist the reader in obtaining a thorough overview of the current state of the art. A few examples of systems for which references are provided include that by Kangas et al. wherein a system is described in which real objects transmit code and data via a wireless communication link. The information passed is primarily for the purpose of explaining and facilitating the use of the objects.

Starner et al. describe a system in which visual tags are used on active objects to identify, to the augmented reality system, the room in which a user resides. The user location is determined by a priori knowledge of the location of objects.

A video see-through system in which passive machine-readable tags (e.g. barcodes) are read by the augmented reality system is presented in Rekimoto. No attempt is made, however, to use the data for head tracking, and the tags themselves are not active.

Want et al. describe a system in which the user carries an active infrared device into a room. In the room, sensors detect the emanations, compute the user's location, and then relay the information to the user. The system is not intended to track the user's orientation, and there is no mention of an augmented reality application for this system.

Although fiducial objects have been used in varying capacities with augmented reality systems, none of the uses contemplate the use of fiducial objects in an active manner such that they can be discovered and used as fiducials by a video-based tracker in an augmented reality system. Thus, a need exists in the art for a type of fiducial that incorporates an object (fiducial) with an attached or embedded computer system that uses a wireless communication subsystem to broadcast geospatial location, geometry, appearance, and other data to the augmented reality system for use by the video-based tracker. Thus, it is desirable to provide a computer system for providing location-registered patterns that incorporate information regarding objects in an area.

The following references are provided to assist the reader in gaining more knowledge regarding the state of the art in this technical area.

REFERENCES (1) Azuma, R. T., "A Survey of Augmented Reality", Presence: *Teleoperators and Virtual Environments*, Vol. 6, No. 4, MIT Press, Cambridge, Mass., August 1997, pp. 355–385.

(2) *Specification of the Bluetooth System, Core, Volume* 1, LM Ericsson, IBM, Intel Corporation, Nokia Corporation, and Toshiba Corporation, Dec. 1, 1999.

(3) *Specification of the Bluetooth System, Profiles, Volume* 2, LM Ericsson, IBM, Intel Corporation, Nokia Corporation, and Toshiba Corporation, Dec. 1, 1999.

(4) *CF+and CompactFlash Specification, Revision* 1.4, CompactFlash Association, Palo Alto, Calif. April 1999 (http://www. compactflash. org).

(5) Cho, Y., J. Park, U. Neumann, "Fast Color Fiducial Detection and Dynamic Workspace Extension in Video See-Through Self-Tracking Augmented Reality", *Proceedings, The Fifth Pacific Conference on Computer Graphics and Applications*, IEEE Computer Society, Los Alamitos, Calif. October 1997, pp. 168–177, 222.

(6) Cho, Y., U. Neumann, "Multi-ring Color Fiducial Systems for Scalable Fiducial Tracking Augmented Reality", *Proceedings, IEEE* 1998*Virtual Reality Annual International Symposium* (VRAIS'98), IEEE Computer Society, Los Alamitos, Calif., March 1998, pp. 212–215.

(7) Dempski, K. L., "Context-Sensitive eCommerce", 2000*Conference on Human Factors in Computer Systems*(*CHI* 2000) *Extended Abstracts*.

(8) Fickas, S. et al, "Software Organization for Dynamic Adaptable Wearable Systems", Digest of Papers, First International Symposium on Wearable Computers, 1997, ACM Press, Cambridge, Mass., October 1997, pp. 56–63.

(9) GeoVRML compact Document Type Description, Extensible 3D (X3D) Task Group, Web 3D Consortium, (http://www. web3d. org/TaskGroups/x3d/translation/GeoVrml-compact.dtd).

(10) Reddy, M., L. Iverson, GeoVRML 1.0 Recommended Practice, Version 1.0.7, GeoVMRL Working Group, Web 3D Consortium (http://www. geovrml. org/1.0/doc/index.html).

(11) Web page, "CerfBoard for Windows: Specifications", (http://www. intrinsync. com/products/referenceplatforms/cerfboard_winspecs.html).

(12) Krumenaker, L., "Virtual Assembly", MIT Technology Review, Massachusetts Institute of Technology, Cambridge, Mass., February/March 1997, pp. 18–19.

(13) Kangas, K., J. Roning, "Using Code Mobility to Create Ubiquitous and Active Augmented Reality in Mobile Computing", *Proceedings of the Fifth Annual*

ACM/IEEE International Conference on Mobile Computing and Networking, ACM Inc., New York, August 1999, pp. 48–58.

(14) Neumann, U., S. You, Y. Cho, J. Lee, J. Park, "Augmented Reality Tracking in Natural Environments", In Mixed Reality: Merging Real and Virtual Worlds, Y. Ohta and H. Tamura eds., Springer-Verlag, Berlin, 1999.

(15) Rekimoto, J., "NaviCam: A Magnifying Glass Approach to Augmented Reality", *Presence: Teleoperators and Virtual Environments*, Vol. 6, No. 4, MIT Press, Cambridge, Mass., August 1997, pp. 399–412.

(16) Web page, "Socket Communications: Bluetooth Products", Socket Communications, Inc., 2001, (http://www. socketcom. com/product/bluetooth. htm).

(17) Web page, "Bluetooth Developers", Socket Communications, Inc., 2001, (http://www. socketcom. com/product/bluetooth_dev. htm).

(18) Starner, T. et al, "Augmented Reality through Wearable Computing", *Presence: Teleoperators and Virtual Environments*, Vol. 6, No. 4, MIT Press, Cambridge, Mass., August 1997, pp. 386–398.

(19) "Universal Unique Identifier", *DCE 1.1: Remote Procedure Call*, CAE Specification, Doc. No. C706, The Open Group, October 1997, (http://www. opengroup. org/onlinepubs/009629399/apdxa.htm).

(20) International Standard, ISO/IEC 14772-1:1997, *The Virtual Reality Modeling Language*, International Organization for Standardization, (http://www. web3d. org/technicalinfo/specifications/vrm197/index.htm).

(21) Want, R. et al., "The Active Badge Location System", ACM Transactions on Information Systems, Vol. 10, No. 1, 1992, pp. 91–102.

(22) Web page, "Extensible 3D (X3D) Task Group", Web 3D Consortium, (http://www. web3d. org/x3d.html).

(23) Web page, "Extensible Markup Language (XML)", World Wide Web Consortium (W3C), (http://www. w3. org/XML).

(24) Web page, "Extensible Markup Language (XML) 1.0 (Second Edition)", W3C Recommendation Oct. 6, 2000, World Wide Web Consortium (W3C), (http://www. w3. org/TR/REC-xml).

SUMMARY OF THE INVENTION

The present invention is directed toward the provision of active fiducials for augmented reality. An apparatus comprising a computer system, a method, and a computer program product are presented as three aspects of the present invention. The fiducials are intended to assist augmented reality systems in more accurately tracking their surroundings and to provide for enhanced interaction between an augmented reality system and its surroundings. The active fiducials are objects that store information and actively provide the information to a client system when it is within range.

Generally, apparatus of the present invention comprises a computer system for providing location-registered patterns for providing information regarding objects in an area. The computer system comprises a memory for storing information. The information stored in the memory includes location of at least one object, as well as other information depending on the needs of the particular embodiment. A processor is connected with the memory to retrieve at least a portion of the information stored regarding the object from the memory in order to transmit the information to the client system via a wireless communication module. A wireless communication module is attached with the processor, and is configured to detect the presence of a compatible client system within its communication range. If a compatible client system is detected, the computer system transmits at least a portion of the information regarding the object, including the location of the object, to the client system. Thus, a single computer may be used in conjunction with multiple objects, or a computer can be used at each object.

In further embodiment, the information stored regarding the object includes information regarding the appearance of the object, preferably in the form of a three-dimensional representation of the object computed such that the client system can use the location of the object, the known or estimated location of the client system, and the three-dimensional representation of the object in order to provide a user with a visual representation of the object from a the point of view of the client system.

In a further embodiment, the information regarding the object includes an object identification, which when retrieved by the client system may be used to obtain further information regarding the object from a database.

In a still further embodiment, the object has a state, and the information regarding the object includes a representation of the object state. Thus, for example, the temperature (state) of a thermometer could be included in the information.

The computer system may be further provided with the ability to receive a signal from a client system via its wireless communication module and to use the information to alter the state of the object. Thus, the objects may have the ability to interact with a client system. Additionally, the information may be in the form of multimedia information, including audio, video, or text information.

In a further embodiment, the computer system may include the ability to receive a system identifier from a client system and to send selective information to the client system based on the system identifier, whereby different client systems may have access to different information regarding the object. Thus, users of the client systems may be provided with selected information regarding the object, including selected state information.

In another embodiment, the computer system may include the ability to receive notes, including target system identifiers, in order to transmit the notes to the target systems. Thus, the objects may facilitate messaging. The messages may be configured such that they are only transmitted to the target when the target enters the transmission range of the object where the note was made. Thus, users may leave messages at objects for selected other users. The computer system may also be configured to interact with other computer systems (in other objects) to facilitate communications between client systems located near different objects.

In a still further embodiment, the computer system further comprises a network interface connected with the processor for networking with other computer systems, whereby the computer system can interact with computer systems in other objects or other computer systems such as those on the Internet.

In another embodiment, the memory of the computer system may be configured to store the system identifiers of client systems that have come within range of the computer system. Thus, data may be collected regarding where the users have been. This data may be transmitted by the computer system to another computer. Thus, data may be ported to another computer and location for further analysis. Thus, the behavior of users may be analyzed. A network interface may be provided for this purpose.

In yet another embodiment, the computer system may interact over a network, such as the Internet, and may connect with a data server to download updated information regarding the object. Thus, the active fiducial can stay current in the event of enhancements to its programming or in the event of changes regarding the object.

In a further embodiment, some of the objects may be virtual objects. At least a portion of the information transmitted to the client receiver in this case is display information provided to facilitate the display of a representation of the object in a computerized display at its appropriate location within the field of view of the client system. This display may be customized based on the identity of a particular client system to facilitate a customized representation of the object for the client system.

In another embodiment, the computer system may be configured to receive a request for information from a client system and to send information to the client system based on the request from the client system. Thus, the client may request additional information from the computer system associated with an object. The additional information, for example, may be further specifications of the object.

As mentioned, the present invention also embodies a method for providing location-registered patterns for providing information regarding objects in an area. The method is performed by a computer system comprising a memory, a processor coupled with the memory, and a wireless communication module connected with the processor. The method generally comprises several steps. In one step, information is stored in the memory regarding at least one object, with the information including the location of each object. In another step, at least a portion of the information regarding the object is retrieved into the processor from the memory, with the information including the location of the object. The information is prepared for transmission to the client system via the wireless communication module. In a still further step, the wireless communication module detects the presence of a compatible client system within a communication range of the wireless communication module. If a compatible client system is detected, at least a portion of the information regarding the object is transmitted to the client system, including the location of the object.

In another embodiment, the information stored in the information storing step includes information regarding the appearance of the object, preferably in the form of a three-dimensional representation of the object computed such that the client system can use the location of the object and the three-dimensional representation of the object in order to provide a user with a visual representation of the object from a the point of view of the client system.

The information stored in the information storing step may also include an object identification, which when received by the client system may be used to obtain further information regarding the object from a database.

The object may also have a state and the information stored in the information storing step regarding the object may include a representation of the object state.

The method may also include the additional steps of receiving a signal from a client system at the wireless communication module and to using the information to alter the state of the object.

In a further embodiment, the method may also include the additional steps of receiving a system identifier from a client system and of sending selective information to the client system based on the system identifier, whereby different client systems may have access to different information regarding the object. The information may be in the form of multimedia information including information selected from the group consisting of audio, video, and text information.

In a still further embodiment, the method may comprise the additional steps of receiving a note from a client system with at least one target client system identifier and of transmitting the note to client systems that provide a system identifier matching the target client system identifier.

In another embodiment, the computer system operating the steps in the method is coupled with a specific object, and the information stored in the information storing step is regarding that particular object. Further, the information stored in the information storing step regarding the object includes a representation of the object state. The computer system may be further configured to facilitate the steps of receiving a signal from a client system at the wireless communication module, with the signal including information, and using the information to alter the state of the object.

In another embodiment, the computer system used for performing the method is configured to facilitate the steps of receiving a system identifier from a client system and of sending selective information to the client system based on the system identifier, whereby different client systems may have access to different information regarding the object. Information may also be received from the client system and used to customize the information sent to the client system. Thus, the client system may incorporate a user or system profile, which may be used by objects for customization, e.g., the system profile may include a user's favorite color, which could be used, in turn, to affect the appearance of objects. Customized information regarding the object's state could also be provided in a similar manner.

In a further embodiment, the computer system used for performing the steps of the method further comprises a network interface connected with the processor to facilitate the step of networking with other computer systems, whereby the computer system can interact with computer systems in other objects or other computer systems such as those on the Internet. The interactions with other computer systems could also take the form of interaction between other computer systems associated with other objects in order to facilitate communications between client systems located near different objects.

In yet another embodiment of the method of the present invention, the memory of the computer system may be operative to facilitate the step of storing the system identifiers of client systems that have come within communication range of the computer system. Thus a database of users who have visited a particular object may be built. This information may be communicated to other computers to facilitate analysis. Further, the identity of particular users may be used as a user profile in order to customize the display of objects to a user based on their identity and profile.

In a still further embodiment, the computer system used in conjunction with the method of the present invention may comprise a network interface connected with the processor to facilitate a step of networking with other computer systems, and wherein the computer system is configured to connect with a data server to download updated information regarding the object. Thus, all software related to the object may be kept current.

At least a portion of the objects represented by the method of the present invention can be virtual objects, in which case, at least a portion of the information transmitted to the client receiver is display information provided to facilitate the display of a representation of the object in a computerized display at its appropriate location within the field of view of the client system.

In a still further embodiment, the computer system is configured to facilitate a step of receiving a request for information from a client system and to send information to the client system based on the request from the client system.

All of the steps and aspects of the method of the present invention may be incorporated as means on a computer-readable medium for use in a computer system comprising a memory, a processor coupled with the memory, and a wireless communication module connected with the processor. Thus, the present invention may be embodied in the form of a computer program product.

These features and benefits of the present invention are discussed in greater detail, and with reference to the drawings, in the detailed description below.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
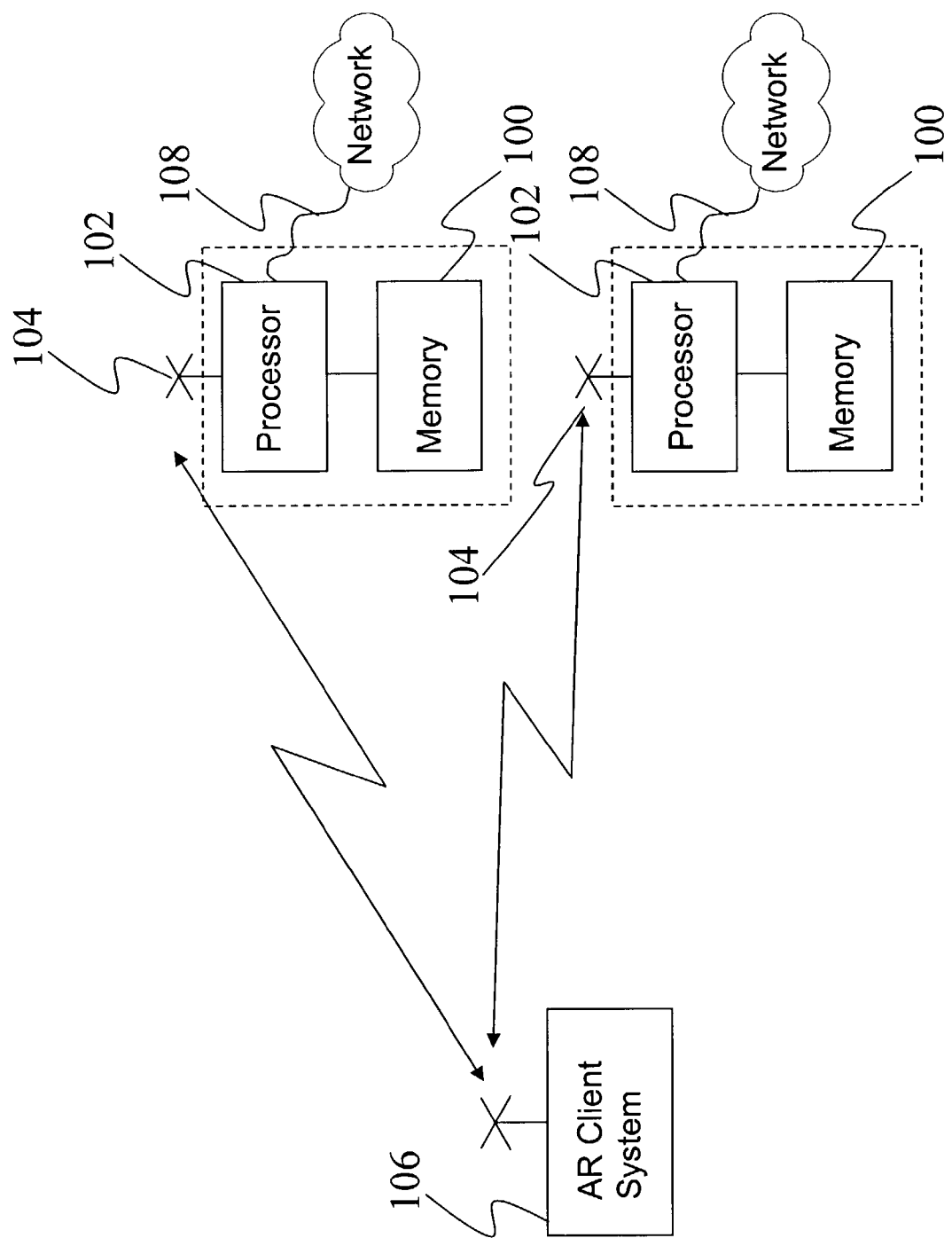
FIG. 1 is a block diagram depicting an augmented reality client user system interacting with two active fiducials.

The present invention provides an apparatus, a method, and a computer program product for enabling objects, or fiducials, to enhance the capabilities of augmented reality systems by providing location information and other information regarding the objects. It should be understood that this description is not intended to limit the invention. On the contrary, the invention is intended to cover alternatives, modifications and equivalents, which are included in the spirit and scope of the invention as defined by the appended claims. Furthermore, in the following detailed description of the present invention numerous specific details are set forth in order to provide a thorough understanding of the present invention. However, it will be obvious to one of ordinary skill in the art that the present invention may be practiced without the specific details.

As will be appreciated by one of skill in the art, the present invention may be embodied as a method, data processing system, or a computer program product. Accordingly, the present invention may take the form of a hardware embodiment, a software embodiment, or an embodiment combining hardware and software aspects. Furthermore, the present invention may take the form of a computer program product on a computer-readable storage medium having computer-readable program means embodied in the medium. Any suitable computer readable medium may be utilized including hard disks, CD-ROMs, optical storage devices, or magnetic storage devices.

In order to provide a working frame of reference, first a glossary of terms used in the description and claims is given as a central resource for the reader. The glossary is not intended to provide specific limitations regarding the terms used, but rather, is intended to assist the reader by providing a general understanding of some of the terms used herein. After the glossary, a brief introduction to the physical embodiments of the present invention is provided prior to discussing its other aspects.

(1) Glossary

Before describing the specific details of the present invention, it is useful to provide a centralized location for various terms used herein and in the claims. The terms defined are as follows:

Fiducial—The term "fiducial" as used with respect to this invention generally indicates an object having a known location, which can be used by an augmented reality system in order to ensure that the system's location and orientation tracking is accurate. More specifically, "active fiducials" are fiducials that actively provide information regarding their location to an augmented reality tracker system. For comparison, passive fiducials are those that do not provide information to an augmented reality tracker system, but whose location and orientation relative to the tracker can be used via pattern or template matching to determine the location and orientation of the tracker.

Means—The term "means" as used with respect to this invention generally indicates a set of operations to be performed on a computer. Non-limiting examples of "means" include computer program code (source or object code) and "hard-coded" electronics. The "means" may be stored in the memory of a computer or on a computer readable medium.

(2) Physical Embodiments of the Present Invention

The present invention has three principal physical embodiments. The first is a computer system for providing location-registered patterns regarding at least one object in an area to an augmented reality tracker system (the client). The second physical embodiment is a method, typically software, operated on a data processing system. The third principal physical embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks and flash-type memories. These embodiments will be described in more detail below.

(3) Active Fiducial Objects

The present invention provides a means for augmenting objects that normally occur in an indoor environment so that they can be discovered and used as fiducials by a video-based tracker in an augmented reality (AR) system. One approach to fulfill this goal is to implant an embedded computer system into objects that uses a short-distance, low-power wireless communication system in order to broadcast location, geometry, and appearance data to the augmented reality system for use by the video-based tracker.

A block diagram of an embodiment of an active fiducial object of the present invention is depicted in FIG. 1. The active fiducial object generally comprises a memory 100 for storing information, a processor 102 connected with the memory, and a wireless communication module 104 connected with the processor 102. In a preferred embodiment, the memory 100 is a Flash EEPROM memory, and the communication module 104 is a short-range wireless transceiver operating on a radio frequency channel, such as those using the Bluetooth standard. Furthermore, the active fiducial object also includes capabilities for resource discovery and for the formation of various networks (ad hoc, point-to-point, picoNet, etc.) with other local transceivers.

The embedded processor 102 commands and controls the communication module 104 and reads from/writes to the memory 100, and is capable of reading the relevant state of the physical fiducial object, if any. The relevant state of the object could be, for example, an on/off condition for a lamp, the current time for a wall clock, or the temperature setting for a thermostat. Virtually any object can be used as an active fiducial object. Information stored in the memory 100 regarding the object may include state information regarding the object, information regarding the location of the object, and information regarding the appearance of the object. In a case where the object includes a sensor, such as when the object is a thermometer, the state information may contain information regarding the object's surroundings. The information regarding the appearance of the object may be a geometric description of the actual object to allow for a proper representation of the object in the viewfinder of an augmented reality system, or it may be a geometric description that is different from the actual physical appearance of the object.

The embedded processor 102 includes software for controlling the communication module 104 for attempting to form a network connection (point-to-point, ad hoc, picoNet, etc.) with any other communication modules 104 range. If an augmented reality tracker system 106 is detected in the network, the embedded processor 102 prepares a model data message based on an object identifier, the geometric description of the object, the appearance (surface) of the object, and the geospatial location data stored in the memory 100. The geospatial location of the active fiducial object may be determined by any standard location technique such as use of global positioning system (GPS) receiver or by derivation using standard survey techniques. Preferably, the model data message is in the form of an XML-based Extensible 3D (X3D) format using a GeoVRML profile. The model data message is transmitted to the augmented reality tracker via the communication module 104. Document type description files may be referenced by a URL in the model data message. Note that DTD text may also be embedded in the message for fiducials not connected to the Internet, such as stand-alone clocks, etc. Access to a network such as the Internet may be provided by a network connection 108 so that these files may be retrieved. The network connection 108, though depicted as a wired connection may also take place via the wireless channel or other connection means. The memory 100 is used to store an object identifier, geometry, appearance, and the geospatial location of the active fiducial object. The object identifier uniquely identifies the object, preferably using a universally unique identifier (UUID) string. The geometry, appearance, location, and orientation of the fiducial object are preferably represented according to the GeoVRML Specification. GeoVRML is an extension of the international VRML standard that provides support for locating virtual objects at geospatial locations.

In operation, when an active fiducial object is powered up, it attempts to form a network connection with any other wireless device it detects. After it has succeeded in forming a network connection (including adding new devices as they arrive), the active fiducial object attempts to detect the presence of an augmented reality tracker. If an augmented reality tracker is detected, the processor 102 formats a model data message and sends it to the augmented reality tracker. The software in the augmented reality tracker extracts and processes the information from the model data message for use in detecting the physical fiducial object in its input video data stream. Processing may include rendering an image from the model data and estimated location of the tracker to use in template matching.

(4) The Computer System

As discussed, the active fiducial objects of the present invention may be embodied as a computer system used for providing location-registered patterns that provide information regarding objects in an area. The memory 100 of the computer system stores information regarding at least one object. It is important to note that the same computer system can be used to provide information regarding multiple objects in an area. Typically, the area may comprise a room within a building, and the objects may represent any object within the room. The information regarding the objects includes the location of the object, and may include other information such as a geometric description of the object and state information regarding the object. The information regarding the object may also be stored remotely over a network connection 108, which may provide access to information on a network such as a local area network or the Internet. Updates to the information may be provided to the computer system via the network connection 108 in order to ensure that the computer system has the latest data regarding the object in order to provide the information to a client system (an augmented reality system) 106 within transmission range. The processor 102 retrieves at least a portion of the information regarding the object from the memory 100 for provision to the client system and prepares it for transmission as a model data message via the wireless communication module 104. As previously mentioned, any wireless medium could be used with the present invention, examples of which include radio frequency and infrared radiation bands. The wireless communication module 104 is configured to detect the presence of a compatible client system 106 within transmission range, and to transmit at least a portion of the information regarding the object, including the location of the object, from the computer system to the client system 106.

As mentioned previously, the information regarding the object includes at least the location of the object, but may also contain other information, for example, information regarding or describing the appearance of the object, information regarding the state of the object, or some other sensed information. Preferably, the information regarding the appearance of the object is a three-dimensional representation of the object that allows the client system 106 to use the location of the object, known location of the client system, and the three-dimensional representation of the object in order to provide a user with a visual representation of the object from the point of view of the client system 106. The representation may also be used for template matching within the augmented reality tracker when client system location is not well known to assist in the tracker's determination of its position and orientation. As mentioned before, the geometry, appearance, location, and orientation of the physical object may be represented through a modeling specification such as the GeoVRML specification, which is commonly known in the art. The information regarding the object may comprise audio, video, and text information.

Further, it is preferable that an object identification be provided for each object. Using the object identification can allow a client system 106 to access additional information regarding the specific object from a database. The database may be resident on the client system, or it may be a remotely accessible database. Further, the object identification can allow the object to communicate via its network connection 108 in order to provide its information to another computer system for a number of possible reasons, examples of which include diagnostic analysis and data storage.

As mentioned, the information regarding the object can include information regarding the state of the object. This may be useful, particularly in cases where the object has a function that is not necessarily apparent, and it can also be used to assist the user of the client system 106 in remotely manipulating the object's state. For example, in a large room, the user may desire to determine the thermostat setting and to adjust it without having to physically move to the location of the thermostat. Using the present invention in conjunction with a client system 106, the user may simply indicate that information is desired regarding the thermostat. A display of the thermostat may appear for the user including information regarding the current temperature to which it is set and the current room temperature. The user may then adjust the temperature to which the thermostat is set without having to physically approach the thermometer. In this case, the client system 106 is able to remotely manipulate the state of the object. Other similar examples involve the reading or setting of time, and the checking and adjusting of television channels. The state information and its manipulation vary depending on the object, and these examples are provided as non-limiting illustrations to provide the reader with a sense for the operation of the present invention in this regard. In cases where the state of the object can be altered by the client system 106, the client system transmits a command to the object. The object, in turn, receives the information, and can alter its state accordingly.

In another embodiment, the computer system used in conjunction with the objects can be configured to receive a system identifier from a client system 106. This assumes that the client systems 106 each incorporate a unique system identifier. Based on the system identifier received, the computer system sends back selective information to the client system 106 based on the system identifier. In this manner, different client systems 106 may be given different levels of access to information regarding the object. This may be useful for ensuring that only certain users can access certain features of the object, e.g., in the case of a thermostat, it is possible to provide all users with the ability to read the temperature, but only a certain subset of the users with the ability to alter the temperature.

In addition to simply serving as a mechanism for reviewing information about, and altering the state of, an object, the object may also serve as a repository for targeted notes from one user to another. A client system 106 may provide a note that is received by the computer system used in conjunction with an object. The note typically includes a source client identifier, a target client system identifier, and the contents of the note. When the client system 106 identified by the target client identifier enters within transmit range of the computer system used in conjunction with the object, the computer system transmits the note to the desired recipient. Thus, one user may leave a note regarding a particular object for another user. The note may incorporate text, video, audio, or other information. Notes could also be self-addressed. For example, a user could leave a "to do" list note at a door, which could be displayed whenever the user approaches the door as a reminder and as an opportunity to update the list.

In terms of the physical architecture of the system, the computer system associated with an object may be physically resident, or coupled, with the specific object, with the information transmitted by the computer system being only in regard to that object. On the other hand, a single computer system may be used in conjunction with multiple objects. For example, each object may include a means for communicating state information, e.g. position information, etc., with the computer system. A single computer system could then be used to perform the communication tasks for a variety of objects in a room, thus centralizing the computing resources.

In addition to communications between the computer system associated with an object and client systems 106, the objects may be configured to communicate with each other. Thus, for example, an object can "know" of the presence of a particular user and can potentially transmit its location to the user via its communication with other objects. This feature can be particularly useful in situations where a user may be seeking a particular type of object. The user may transmit a signal to local objects seeking a particular object, and the objects may communicate with each other to determine the location of the particular object. Thus, it may be possible to search within a given area for an object desired by the user.

In another embodiment, the computer systems associated with the objects are operative to store information from the client systems 106 that approach within communication range. For example, the computer systems could track information regarding which users tend to be interested in a particular class of objects. In future stores, this information could be used for optimizing storefront displays based on the correlation of user interests from the information collected from the computer systems associated with objects. Thus, a retailer could classify and arrange objects that exhibit user interest correlation so that a buyer is better able to find items for which they search. The information regarding the client systems 106 (or the objects with which a client system has interacted) may also be provided to a remote database via the network connection 108. The information regarding the client systems 106 may also comprise a user profile with information representing certain interests of a user. The interests of the user may be used to automatically set the state of objects receiving the user profile—whether receiving the information directly through the computer system's communication interface 104 or from another computer in inter-object communications.

The information provided to the client system 106 can facilitate the display of a representation of the object in a computerized display of the client system 106. The representation can display the object at an appropriate location in the field of view of the client system 106. As mentioned, this function may also aid in template matching using physical objects for more accurate location and orientation determination in an augmented reality tracker. Information, or a profile, received from the client system 106 can also be used by the computer system associated with the object to represent the object in a customized manner for the user of the client system 106. For example, if a client system profile indicates that a particular user enjoys a particular cartoon character, the cartoon character could be incorporated into the representation of a clock so that the clock is more appealing to the particular user. Thus, the settings and fixtures of a room may be customized to match the tastes of a particular user.

The computer systems associated with objects can also be configured to receive a request for information from a client system 106 and then to send information based on the request. Thus, rather than actively detecting a client system's presence, the computer system associated with the objects can remain passive until information is requested by a client system. In the alternative, the computer system associated with objects can detect client systems 106 within range, and can transmit a certain set of information automatically, while awaiting a specific request for information from a client system 106 prior of transmitting additional information based on the request.

Next, the method and computer program product embodiments of the present invention will be discussed.

(5) The Method and the Computer Program Product

Figure 2:
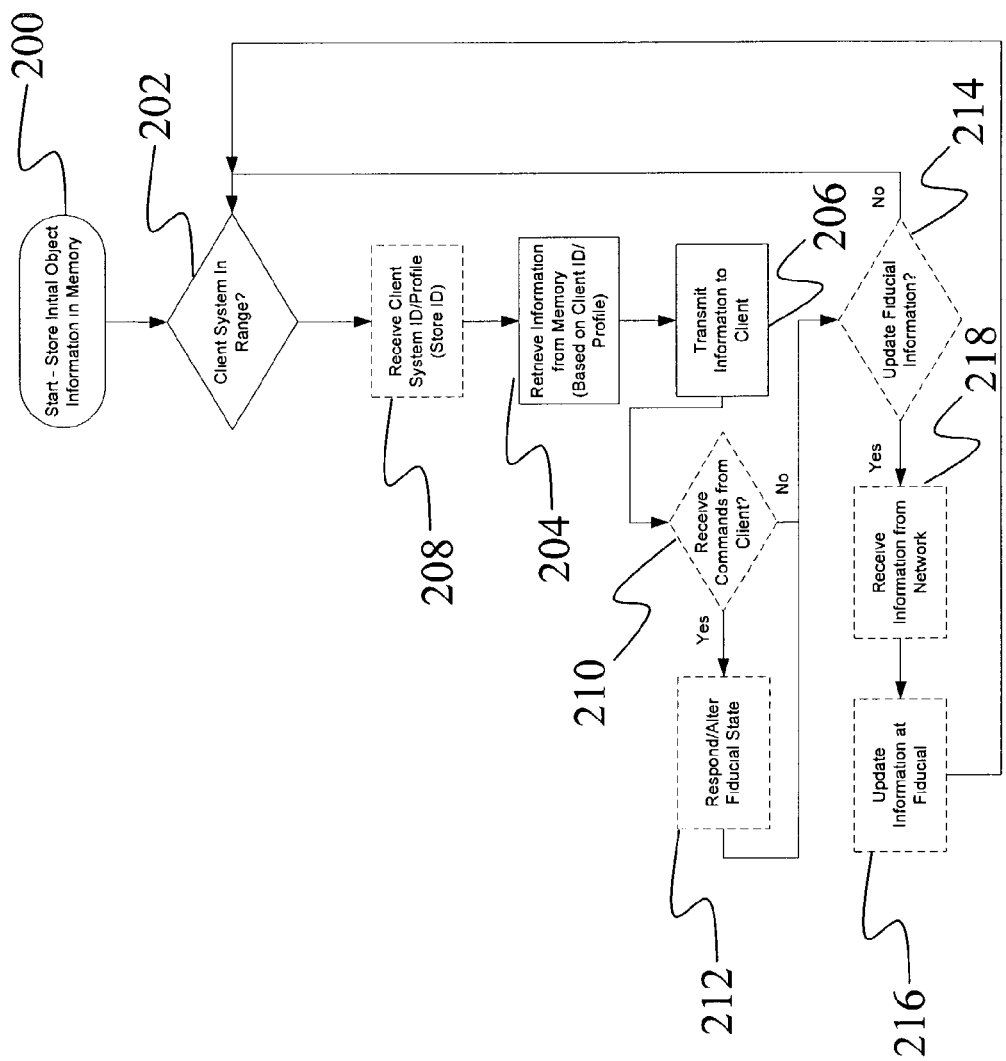
FIG. 2 is a flow chart depicting the steps of the method of the present invention.

The steps in the method of the present invention are depicted in FIG. 2. The steps indicated by solid elements in the figure represent the general steps in the method, and the steps indicated by dashed elements in the figure represent more specific and optional steps. The method is operated in a computer system as previously discussed, comprising a comprising a memory, a processor coupled with the memory, and a wireless communication module connected with the processor. The first step in the method, represented by the start box in the figure is a storing information step 200 for storing the initial information in the memory of the active fiducial object, with the information regarding the object and including a location of the object. Next, in a detecting step 202, the computer system waits to determine whether a client system is within a determined range of an object. The range is generally the overall transmission range of the wireless communication module. In this step, the computer system also determines whether the client system is of a compatible type. Once a client system is detected within range of the object, at least a portion of the information regarding the object is retrieved from the memory into the processor for transmission to the client via the wireless communication module in an information retrieving step 204. It is in this step that a message is formatted and prepared for transmission to a client system. The message is then transmitted to the object in order to pass data to the client system in a transmitting step 206. These four steps form the basis for the operation of the method of the present invention. Although presented in a specific order, the actual order in which they are performed may be varied in accordance with the needs of a particular embodiment of the present invention.

As mentioned previously, the information stored in the storing information step 200 preferably includes information regarding the appearance of the object, and more preferably is in the form of a three-dimensional representation of the object computed such that the client system can use the location of the object and the three-dimensional representation of the object in order to provide a user with a visual representation of the object from a the point of view of the client system. The three-dimensional representation may be an accurate representation of the physical appearance of the object, or it may be very different from the physical appearance, depending on the needs of a particular system. For example, a wall clock may be represented accurately as a wall clock, or could be transformed into a virtual representation of a grandfather clock, depending on the needs of a particular embodiment.

The information stored in the storing information step 200 may also include the storage of an object identification, which may be transmitted as part of the information to the client system, and which, when received by the client system, may be used to obtain further information regarding the object from a database. For example, if a user were working in automobile repair, it would be possible when looking at a particular part, which incorporates the present invention, to request further information from an external database regarding the repair history of the device. Further information regarding an object may be requested for any number of reasons, including trying to locate or find information on similar objects. Note that the information may be any form of information including multimedia information comprising a combination of text, audio, and video information.

Depending on the nature of an object, it may also include an object state, e.g., the current temperature in the case of a thermometer, the current channel in the case of a television, etc. The object state can also be included as information stored in the storing information step 200 regarding the object. The state may be represented in the form of data or may be a physical representation, e.g., when a thermostat is above a certain temperature, it can be made to appear in a certain color such as red.

When a client system enters the range of an object, the client system may transmit a client system identifier. The computer system associated with the object may be configured to receive the identifier from the client system in a client system identifier receiving step 208 after the detecting step 202. Alternatively, the client system identifier may be in the form of a client system profile, which may provide a larger amount of information regarding the client system. The client system profile may also be stored away from the client system, and may be accessed by the computer system associated with the object via a network connection. The client system identifier may be used to customize the information provided by an object for a particular user. For example, an object may appear in different shapes depending on the preferences of a particular user, or different levels or amounts of information may be provided depending on the client system identifier. Thus, the client system identifier can act as a means for allowing user-specific access to certain information.

In addition to use simply for tailoring the information transmitted from the computer associated with an object, the client system identifier may also be stored either locally or remotely. Local storage allows the object to retain knowledge regarding user entries into its range. Activities taken by the user may be recorded so that when a user returns to the area of an object, it can take on the same state it had when the user left. Thus, the client system identifier can be used in a manner similar to the way in which "cookies" are used when browsing the Internet. Additionally, the client system identifier may be used more broadly in order to correlate the user's activities in order to determine information about the user. For example, in a store, items that are commonly visited by the same user may have some correlation to that "type" of user. On a broad level, the storage of client system identifiers can facilitate a great deal of analysis and the correlation of user interests.

Note that along with the client system identifier or profile, the client system may also be configured to transmit notes to an object for retransmission to other client systems. The notes can be information to be provided to all other client systems or they may contain a target client system identifier in order to ensure that they are provided only to a desired client system. The notes can be used, for example, to pass a "to do" list to another user who later visits the object (or it could be targeted to the user who left it as a reminder list).

In addition to simply transmitting information to the client, the client can optionally transmit commands to the computer associated with an object in a command receiving step 210. In this step, a signal is received from a client system at the wireless communication module of the computer system associated with an object. In a case where commands are received from a client system, the computer system associated with the object to which the commands pertain can use the information received from the client system in order to alter the state of the object in a step of responding/altering the state 212.

As depicted in FIG. 2, if no commands are received in the command receiving step 210, or if the state of the object has been altered in the step of responding/altering the state 212, a determination may be made whether to update the information at the fiducial. The information updated could be any of the information sent to client systems, or it could be software used by the fiducial such as hardware drivers, etc. The determination whether to update the information at the computer system associated with an object is made in an updating step 214. The updating step 214 may be triggered by a variety of events. For example, the updating step 214 may be performed on a periodic basis at regular time intervals, or it may be performed in response to a user command. The updating step 214 may also be performed by continuously probing over a network to determine if updates are available, and if updates are available, the updates are performed automatically.

If an updating step 214 is to be performed, the update data is received from a local network such as a local area network or from a more remote network such as the Internet in an update data receiving step 216. The update data is then applied in the computer system with respect to the object (fiducial) in an information updating step 218.

Regardless whether the data is updated or not, the process starts over with the detecting step 202.

Although depicted as a step for updating data regarding an object, the same network connection may be used to facilitate a step of networking with other computer systems, whereby the computer system can interact with computer systems in other objects or other computer systems such as those on the Internet. This step can be performed at any point desired and can be used to allow the exchange of state information or information regarding client systems in the vicinity with other computer systems. By networking computer systems associated with different nodes, client systems located near different objects may communicate. This communication could be used to provide services such as chat services.

Although the steps of the method are discussed in a particular order, they are presented both here, and in the claims, in this order simply for convenience. The actual performance of the steps may be in any order that enables the invention to function properly. The actual order selected will depend on the specific needs of an embodiment, and is readily determinable by one skilled in the art.

Figure 3:
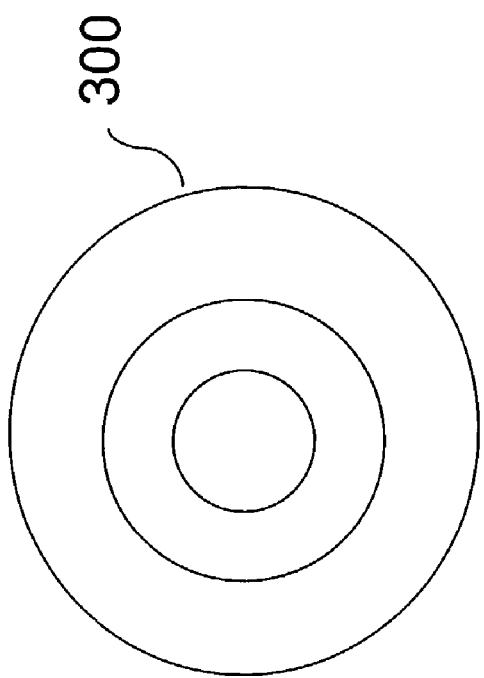
FIG. 3 is an illustrative diagram of a computer program product embodiment of the present invention.

An illustrative diagram of a computer program product embodying the present invention is depicted in FIG. 3. The computer program product 300 is depicted as an optical disk such as a CD or DVD. Typically, the program may be stored on CD or DVD for transport and then encoded onto a device such as a CompactFlash or another type of Flash EEPROM. Flash EEPROM devices are preferable for use with current embedded systems. As mentioned previously, the computer program product generally represents computer readable code stored on any compatible computer readable media. Each of the steps described with regard to the method of the present invention are generally written onto the computer program product in the form of means, which are embodied as computer program code.

What is claimed is:

1. A computer system for providing location-registered patterns for providing information regarding objects in an area, the computer system comprising:
   a. a memory for storing information, with the information regarding at least one object, and with the information including a location of each object;
   b. a processor connected with the memory to retrieve at least a portion of the information regarding the object, including the location of the object, from the memory in preparation for transmission to the client system via a wireless communication module; and
   c. a wireless communication module connected with the processor and configured to detect the presence of a compatible client system within a communication range of the wireless communication module, and if a compatible client system is detected, to transmit at least a portion of the information regarding the object, including the location of the object, from the computer system to the client system.

2. A computer system for providing location-registered patterns for providing information regarding objects in an area as set forth in claim 1, wherein the information regarding the object includes information regarding the appearance of the object.

3. A computer system for providing location-registered patterns for providing information regarding objects in an area as set forth in claim 2, wherein the information regarding the object is a three-dimensional representation of the object computed such that the client system can use the location of the object, the known or estimated location of the client system, and the three-dimensional representation of the object in order to provide a user with a visual representation of the object from a the point of view of the client system.

4. A computer system for providing location-registered patterns for providing information regarding objects in an area as set forth in claim 1, wherein the information regarding the object includes an object identification, which when received by the client system may be used to obtain further information regarding the object from a database.

5. A computer system for providing location-registered patterns for providing information regarding objects in an area as set forth in claim 1, wherein the object has a state and where the information regarding the object includes a representation of the object state.

6. A computer system for providing location-registered patterns for providing information regarding objects in an area as set forth in claim 5, wherein the computer system is configured to receive a signal from a client system at the wireless communication module and to use the information to alter the state of the object.

7. A computer system for providing location-registered patterns for providing information regarding objects in an area as set forth in claim 5, wherein the computer system is configured to receive a system identifier from a client system and to send selective information to the client system based on the system identifier, whereby different client systems may have access to different information regarding the object.

8. A computer system for providing location-registered patterns for providing information regarding objects in an area as set forth in claim 7, wherein the computer system is configured to receive a note from a client system with at least one target client system identifier and to transmit the note to client systems that provide a system identifier matching the target client system identifier.

9. A computer system for providing location-registered patterns for providing information regarding objects in an area as set forth in claim 1, wherein the information is in the form of multimedia information including information selected from the group consisting of audio, video, and text information.

10. A computer system for providing location-registered patterns for providing information regarding objects in an area as set forth in claim 1, wherein the computer system is coupled with a specific object and wherein the information is regarding that object.

11. A computer system for providing location-registered patterns for providing information regarding objects in an area as set forth in claim 10, wherein the information regarding the object includes information regarding the appearance of the object.

12. A computer system for providing location-registered patterns for providing information regarding objects in an area as set forth in claim 11, wherein the information regarding the object is a three-dimensional representation of the object computed such that the client system can use the location of the object, the known or estimated location of the client system, and the three-dimensional representation of the object in order to provide a user with a visual representation of the object from a the point of view of the client system.

13. A computer system for providing location-registered patterns for providing information regarding objects in an area as set forth in claim 12, wherein the object has a state and where the information regarding the object includes a representation of the object state.

14. A computer system for providing location-registered patterns for providing information regarding objects in an area as set forth in claim 13, wherein the computer system is configured to receive a signal from a client system at the wireless communication module and to use the information to alter the state of the object.

15. A computer system for providing location-registered patterns for providing information regarding objects in an area as set forth in claim 13, wherein the computer system is configured to receive a system identifier from a client system and to send selective information to the client system based on the system identifier, whereby different client systems may have access to different information regarding the object.

16. A computer system for providing location-registered patterns for providing information regarding objects in an area as set forth in claim 15, wherein the computer system is configured to selectively send information based on the system identifier of a client system.

17. A computer system for providing location-registered patterns for providing information regarding objects in an area as set forth in claim 15, wherein the computer system is configured to receive information from a client system and to use the information to customize the state information sent to the client system.

18. A computer system for providing location-registered patterns for providing information regarding objects in an area as set forth in claim 17, wherein the computer system further comprises a network interface connected with the processor for networking with other computer systems, whereby the computer system can interact with computer systems in other objects or other computer systems such as those on the Internet.

19. A computer system for providing location-registered patterns for providing information regarding objects in an area as set forth in claim 18, wherein computer system is configured to interact with other computer systems in other objects in order to facilitate communications between client systems located near different objects.

20. A computer system for providing location-registered patterns for providing information regarding objects in an area as set forth in claim 15, wherein the memory of the computer system is operative to store the system identifiers of client systems that have come within communication range of the computer system.

21. A computer system for providing location-registered patterns for providing information regarding objects in an area as set forth in claim 20, wherein the computer system further comprises a network interface for communication with other computer systems and wherein the computer system provides the system identifiers of client systems that have come within communication range of the computer system to another computer.

22. A computer system for providing location-registered patterns for providing information regarding objects in an area as set forth in claim 10, wherein the computer system further comprises a network interface connected with the processor for networking with other computer systems, whereby the computer system can interact with computer systems in other objects or other computer systems such as those on the Internet.

23. A computer system for providing location-registered patterns for providing information regarding objects in an area as set forth in claim 1, wherein the computer system further comprises a network interface connected with the processor for networking with other computer systems, and wherein the computer system is configured to connect with a data server to download updated information regarding the object.

24. A computer system for providing location-registered patterns for providing information regarding objects in an area as set forth in claim 1, wherein at least a portion of the objects are virtual objects and wherein at least a portion of the information transmitted to the client receiver is display information provided to facilitate the display of a representation of the object in a computerized display at its appropriate location within the field of view of the client system.

25. A computer system for providing location-registered patterns for providing information regarding objects in an area as set forth in claim 24, wherein the computer system is configured to receive a system identifier from the client system and to customize the information, including the display information to facilitate a customized representation of the object for the client system.

26. A computer system for providing location-registered patterns for providing information regarding objects in an area as set forth in claim 1, wherein the computer system is configured to receive a request for information from a client system and to send information to the client system based on the request from the client system.

27. A method for providing location-registered patterns for providing information regarding objects in an area, with the method being performed by a computer system comprising a memory, a processor coupled with the memory, and a wireless communication module connected with the processor, the method comprising the steps of:

a. storing information in the memory regarding at least one object, with the information including a location of each object;

b. retrieving at least a portion of the information regarding the object into the processor from the memory, including the location of the object in preparation for transmission to a client system via the wireless communication module; and c. detecting, at the wireless communication module, the presence of a compatible client system within a communication range of the wireless communication module, and if a compatible client system is detected, transmitting at least a portion of the information regarding the object, including the location of the object, from the computer system to the client system.

28. A method for providing location-registered patterns for providing information regarding objects in an area as set forth in claim 27, wherein the information stored in the storing information step includes information regarding the appearance of the object.

29. A method for providing location-registered patterns for providing information regarding objects in an area as set forth in claim 28, wherein the information stored in the storing information step is a three-dimensional representation of the object computed such that the client system can use the location of the object, the known or estimated location of the client system, and the three-dimensional representation of the object in order to provide a user with a visual representation of the object from a the point of view of the client system.

30. A method for providing location-registered patterns for providing information regarding objects in an area as set forth in claim 27, wherein the information stored in the storing information step includes an object identification, which when received by the client system may be used to obtain further information regarding the object from a database.

31. A method for providing location-registered patterns for providing information regarding objects in an area as set forth in claim 27, wherein the object has a state and where the information stored in the storing information step regarding the object includes a representation of the object state.

32. A method for providing location-registered patterns for providing information regarding objects in an area as set forth in claim 31, wherein the computer system is configured to facilitate additional steps of receiving a signal from a client system at the wireless communication module and to using the information to alter the state of the object.

33. A method for providing location-registered patterns for providing information regarding objects in an area as set forth in claim 31, wherein the computer system is configured facilitate additional steps of receiving a system identifier from a client system and of sending selective information to the client system based on the system identifier, whereby different client systems may have access to different information regarding the object.

34. A method for providing location-registered patterns for providing information regarding objects in an area as set forth in claim 33, wherein the computer system is configured to facilitate additional steps of receiving a note from a client system with at least one target client system identifier and of transmitting the note to client systems that provide a system identifier matching the at least one target client system identifier.

35. A method for providing location-registered patterns for providing information regarding objects in an area as set forth in claim 27, wherein the information stored in the storing information step is in the form of multimedia information including information selected from the group consisting of audio, video, and text information.

36. A method for providing location-registered patterns for providing information regarding objects in an area as set forth in claim 27, wherein the computer system operating the steps in the method is coupled with a specific object and wherein the information stored in the storing information step is regarding that particular object.

37. A method for providing location-registered patterns for providing information regarding objects in an area as set forth in claim 36, wherein the information stored in the storing information step regarding the object includes information regarding the appearance of the object.

38. A method for providing location-registered patterns for providing information regarding objects in an area as set forth in claim 37, wherein the information stored in the storing information step regarding the object is a three-dimensional representation of the object computed such that the client system can use the location of the object, the known or estimated location of the client system, and the three-dimensional representation of the object in order to provide a user with a visual representation of the object from a point of view of the client system.

39. A method for providing location-registered patterns for providing information regarding objects in an area as set forth in claim 38, wherein the object has a state and where the information stored in the storing information step regarding the object includes a representation of the object state.

40. A method for providing location-registered patterns for providing information regarding objects in an area as set forth in claim 39, wherein the computer system used for performing the method is configured to facilitate the steps of receiving a signal from a client system at the wireless communication module, with the signal including information, and using the information to alter the state of the object.

41. A method for providing location-registered patterns for providing information regarding objects in an area as set forth in claim 39, wherein the computer system used for performing the method is configured to facilitate the steps of receiving a system identifier from a client system and of sending selective information to the client system based on the system identifier, whereby different client systems may have access to different information regarding the object.

42. A method for providing location-registered patterns for providing information regarding objects in an area as set forth in claim 41, wherein the computer system used for performing the method is configured to facilitate the step of selectively sending information based on the system identifier of a client system.

43. A method for providing location-registered patterns for providing information regarding objects in an area as set forth in claim 41, wherein the computer system used for performing the method is configured to facilitate the steps of receiving information from a client system and to using the information to customize the state information sent to the client system.

44. A method for providing location-registered patterns for providing information regarding objects in an area as set forth in claim 43, wherein the computer system used for performing the steps of the method further comprises a network interface connected with the processor to facilitate the step of networking with other computer systems, whereby the computer system can interact with computer systems in other objects or other computer systems such as those on the Internet.

45. A method for providing location-registered patterns for providing information regarding objects in an area as set forth in claim 44, wherein the computer system used for performing the steps of the method is configured to facilitate the step of interacting with other computer systems in other objects in order to facilitate communications between client systems located near different objects.

46. A method for providing location-registered patterns for providing information regarding objects in an area as set forth in claim 41, wherein the memory of the computer system is operative to facilitate the step of storing the system identifiers of client systems that have come within communication range of the computer system.

47. A method for providing location-registered patterns for providing information regarding objects in an area as set forth in claim 46, wherein the computer system further comprises a network interface for facilitating the steps of communicating with other computer systems and providing the system identifiers of client systems that have come within communication range of the computer system to another computer.

48. A method for providing location-registered patterns for providing information regarding objects in an area as set forth in claim 36, wherein the computer system further comprises a network interface connected with the processor to facilitate a step of networking with other computer systems, whereby the computer system can interact with computer systems in other objects or other computer systems such as those on the Internet.

49. A method for providing location-registered patterns for providing information regarding objects in an area as set forth in claim 27, wherein the computer system further comprises a network interface connected with the processor to facilitate a step of networking with other computer systems, and wherein the computer system is configured to connect with a data server to download updated information regarding the object.

50. A method for providing location-registered patterns for providing information regarding objects in an area as set forth in claim 27, wherein at least a portion of the objects are virtual objects and wherein at least a portion of the information transmitted to the client receiver is display information provided to facilitate the display of a representation of the object in a computerized display at its appropriate location within the field of view of the client system.

51. A method for providing location-registered patterns for providing information regarding objects in an area as set forth in claim 50, wherein the computer system is configured to facilitate a step of receiving a system identifier from the client system and to customize the information, including the display information to facilitate a customized representation of the object for the client system.

52. A method for providing location-registered patterns for providing information regarding objects in an area as set forth in claim 27, wherein the computer system is configured to facilitate a step of receiving a request for information from a client system and to send information to the client system based on the request from the client system.

53. A computer program product for providing location-registered patterns for providing information regarding objects in an area, with the computer program product comprising a computer-readable medium for use in a computer system comprising a memory, a processor coupled with the memory, and a wireless communication module connected with the processor, computer program product comprising computer readable means including:

a. means for storing information in the memory regarding at least one object, with the information including a location of each object;

b. means for retrieving at least a portion of the information regarding the object into the processor from the memory, including the location of the object in preparation for transmission to the client system via the wireless communication module; and c. means for detecting, at the wireless communication module, the presence of a compatible client system within a communication range of the wireless communication module, and if a compatible client system is detected, transmitting at least a portion of the information regarding the object, including the location of the object, from the computer system to the client system.

54. A computer program product for providing location-registered patterns for providing information regarding objects in an area as set forth in claim 53, wherein the means for storing information stores information regarding the appearance of the object.

55. A computer program product for providing location-registered patterns for providing information regarding objects in an area as set forth in claim 54, wherein the information stored by the means for storing information is a three-dimensional representation of the object computed such that the client system can use the location of the object, the known or estimated location of the client system, and the three-dimensional representation of the object in order to provide a user with a visual representation of the object from a the point of view of the client system.

56. A computer program product for providing location-registered patterns for providing information regarding objects in an area as set forth in claim 53, wherein the information stored by the means for storing information includes an object identification, which when received by the client system may be used to obtain further information regarding the object from a database.

57. A computer program product for providing location-registered patterns for providing information regarding objects in an area as set forth in claim 53, wherein the object has a state and where the information stored by the means for storing information regarding the object includes a representation of the object state.

58. A computer program product for providing location-registered patterns for providing information regarding objects in an area as set forth in claim 57, wherein the computer system further includes means for receiving a signal from a client system at the wireless communication module and means for using the information to alter the state of the object.

59. A computer program product for providing location-registered patterns for providing information regarding objects in an area as set forth in claim 57, wherein the computer system further includes means for receiving a system identifier from a client system and means for sending selective information to the client system based on the system identifier, whereby different client systems may have access to different information regarding the object.

60. A computer program product for providing location-registered patterns for providing information regarding objects in an area as set forth in claim 59, wherein the computer system further includes means for receiving a note from a client system with at least one target client system identifier and means for transmitting the note to client systems that provide a system identifier matching the target client system identifier.

61. A computer program product for providing location-registered patterns for providing information regarding objects in an area as set forth in claim 53, wherein the information stored by the information storing means is in the form of multimedia information including information selected from the group consisting of audio, video, and text information.

62. A computer program product for providing location-registered patterns for providing information regarding objects in an area as set forth in claim 53, wherein the computer system is coupled with a specific object and wherein the information stored by the information storing means is regarding that particular object.

63. A computer program product for providing location-registered patterns for providing information regarding objects in an area as set forth in claim 62, wherein the information stored by the information storing means regarding the object includes information regarding the appearance of the object.

64. A computer program product for providing location-registered patterns for providing information regarding objects in an area as set forth in claim 63, wherein the information stored by the information storing means regarding the object is a three-dimensional representation of the object computed such that the client system can use the location of the object, the known or estimated location of the client system, and the three-dimensional representation of the object in order to provide a user with a visual representation of the object from a the point of view of the client system.

65. A computer program product for providing location-registered patterns for providing information regarding objects in an area as set forth in claim 64, wherein the object has a state and where the information stored by the information storing means regarding the object includes a representation of the object state.

66. A computer program product for providing location-registered patterns for providing information regarding objects in an area as set forth in claim 65, wherein the computer system further includes means receiving a signal from a client system at the wireless communication module, with the signal including information, and using the information to alter the state of the object.

67. A computer program product for providing location-registered patterns for providing information regarding objects in an area as set forth in claim 65, wherein the computer system further includes a means for receiving a system identifier from a client system and means for sending selective information to the client system based on the system identifier, whereby different client systems may have access to different information regarding the object.

68. A computer program product for providing location-registered patterns for providing information regarding objects in an area as set forth in claim 67, wherein the computer system further includes a means for selectively sending information based on the system identifier of a client system.

69. A computer program product for providing location-registered patterns for providing information regarding objects in an area as set forth in claim 67, wherein the computer system used for performing the method further includes means for receiving information from a client system and means for using the information to customize the state information sent to the client system.

70. A computer program product for providing location-registered patterns for providing information regarding objects in an area as set forth in claim 69, wherein the computer system further includes a network interface connected with the processor to facilitate means for networking with other computer systems, whereby the computer system can interact with computer systems in other objects or other computer systems such as those on the Internet.

71. A computer program product for providing location-registered patterns for providing information regarding objects in an area as set forth in claim 70, wherein the computer system is configured to facilitate the means for interacting with other computer systems in other objects in order to facilitate communications between client systems located near different objects.

72. A computer program product for providing location-registered patterns for providing information regarding objects in an area as set forth in claim 67, wherein the memory of the computer system is operative to facilitate the means for storing the system identifiers of client systems that have come within communication range of the computer system.

73. A computer program product for providing location-registered patterns for providing information regarding objects in an area as set forth in claim 72, wherein the computer system further comprises a network interface for facilitating the means for communicating with other computer systems and the means for providing the system identifiers of client systems that have come within communication range of the computer system to another computer.

74. A computer program product for providing location-registered patterns for providing information regarding objects in an area as set forth in claim 62, wherein the computer system further comprises a network interface connected with the processor to facilitate a means for networking with other computer systems, whereby the computer system can interact with computer systems in other objects or other computer systems such as those on the Internet.

75. A computer program product for providing location-registered patterns for providing information regarding objects in an area as set forth in claim 53, wherein the computer system further comprises a network interface connected with the processor to facilitate a means for networking with other computer systems, and wherein the computer system is configured to connect with a data server to download updated information regarding the object.

76. A computer program product for providing location-registered patterns for providing information regarding objects in an area as set forth in claim 53, wherein at least a portion of the objects are virtual objects and wherein at least a portion of the information transmitted to the client receiver is display information provided to facilitate the display of a representation of the object in a computerized display at its appropriate location within the field of view of the client system.

77. A computer program product for providing location-registered patterns for providing information regarding objects in an area as set forth in claim 76, wherein the computer system is configured to facilitate means for receiving a system identifier from the client system and means for customizing the information, including the display information to facilitate a customized representation of the object for the client system.

78. A computer program product for providing location-registered patterns for providing information regarding objects in an area as set forth in claim 53, wherein the computer system is configured to facilitate means for receiving a request for information from a client system and means for sending information to the client system based on the request from the client system.

* * * * *